United States Patent
Bank et al.

(10) Patent No.: US 9,667,677 B2
(45) Date of Patent: *May 30, 2017

(54) AUTONOMIC COLLABORATIVE WORKSPACE CREATION

(71) Applicant: International Business Machines Corporation, Armonk, NY (US)

(72) Inventors: Judith H. Bank, Durham, NC (US); Liam Harper, Dublin (IE); Ruthie D. Lyle, Research Triangle Park, NC (US); Patrick J. O'Sullivan, Dublin (IE); Lin Sun, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 280 days.

This patent is subject to a terminal disclaimer.

(21) Appl. No.: 13/790,574

(22) Filed: Mar. 8, 2013

(65) Prior Publication Data

US 2014/0258213 A1    Sep. 11, 2014

(51) Int. Cl.
G06F 17/30    (2006.01)
H04L 29/06    (2006.01)
H04L 29/08    (2006.01)

(52) U.S. Cl.
CPC ...... *H04L 65/403* (2013.01); *G06F 17/30165* (2013.01); *H04L 67/22* (2013.01); *H04L 67/306* (2013.01)

(58) Field of Classification Search
CPC .............................................. G06F 17/30165
See application file for complete search history.

(56) References Cited

U.S. PATENT DOCUMENTS

| | | | |
|---|---|---|---|
| 2006/0070020 A1 | 3/2006 | Puttaswamy et al. | |
| 2008/0109289 A1* | 5/2008 | Vivadelli et al. | 705/7 |
| 2009/0192845 A1 | 7/2009 | Gudipaty et al. | |
| 2009/0265634 A1* | 10/2009 | Beringer | G06Q 10/10 715/733 |
| 2009/0307598 A1 | 12/2009 | Giles | |
| 2009/0307605 A1 | 12/2009 | Ryan et al. | |
| 2010/0250683 A1* | 9/2010 | Hoyne et al. | 709/206 |
| 2011/0184768 A1 | 7/2011 | Norton et al. | |
| 2012/0173636 A1 | 7/2012 | O'Sullivan et al. | |

OTHER PUBLICATIONS

Jay Levitt, Save Entire Desktop State. Stackoverflow.com, Dec. 27, 2008, 2 pages, < http://stackoverflow.com/questions/395107/save-entire-desktop-state >.

JNSoftware LLC. Finder Window Manager. JNSoftware. May 9, 2011. 13 pages.< http://www.jonn8.com/fwm/ >.

(Continued)

*Primary Examiner* — Kris Mackes
(74) *Attorney, Agent, or Firm* — Jordan IP Law, LLC (57) ABSTRACT

Systems and methods provide for autonomic collaborative workspace creation. Patterns of artifact usage for a plurality of workspaces over a plurality of collaborative interactions may be determined. Some of the multitude of collaborative interactions may be between a subset of the plurality of workspaces. A workspace may be initialized with artifacts for a scheduled collaboration based on the patterns of artifact usage.

11 Claims, 4 Drawing Sheets

(56) References Cited

OTHER PUBLICATIONS

Final Office Action Received for U.S. Appl. No. 14/081,943, mailed on Jun. 30, 2015, 11 pages.
Advisory Action for U.S Appl. No. 14/081,943, mailed Oct. 2, 2015, 6 pages, United States Patent & Trademark Office.
Non-Final Office Action for U.S. Appl. No. 14/081,943, mailed Oct. 19, 2015, 14 pages, United States Patent & Trademark Office.
Non-Final Office Action for U.S. Appl. No. 14/081,943, mailed Sep. 9, 2016, 8 pages, United States Patent & Trademark Office.

* cited by examiner

AUTONOMIC COLLABORATIVE WORKSPACE CREATION

BACKGROUND

Individuals may be involved in collaborative efforts with different groups relating to various topics, wherein each collaborative event may require the individual to initialize a workspace specifically for that collaborative event. Productive time may be lost each time the individual needs to setup a workspace for another collaborative interaction.

SUMMARY

A computer program product may include a computer readable storage medium and computer usable code stored on the computer readable storage medium. If executed by a processor, the computer usable code may cause a computer to take several actions according to various embodiments. According to one of the various embodiments, artifact usage may be tracked for a plurality of workspaces over a plurality of collaborative interactions. The tracked artifact usage may be stored in an artifact repository. An analysis of the tracked artifact usage may be tracked to determine patterns of artifact usage. The patterns of artifact usage may be stored in patterns of artifact usage repository. A workspace may be initialized with artifacts for a scheduled collaboration employing the patterns of artifact usage. According to another of the various embodiments, patterns of artifact usage may be determined for a plurality of workspaces over one or more collaborative interactions and a workspace may be initialized with artifacts for a scheduled collaboration based on the patterns of artifact usage.

According to other embodiments, a method may include determining patterns of artifact usage for a plurality of workspaces over a multitude of collaborative interactions; and initializing a workspace with artifacts for a scheduled collaboration employing the patterns of artifact usage.

BRIEF DESCRIPTION OF THE DRAWINGS

The various advantages of the embodiments will become apparent to one skilled in the art by reading the following specification and appended claims, and by referencing the following drawings, in which:

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments may prime a workspace for an individual prior to the beginning of a collaborative interaction based upon the past behavior of groups of participants during similar collaborative interactions.

Figure 1:
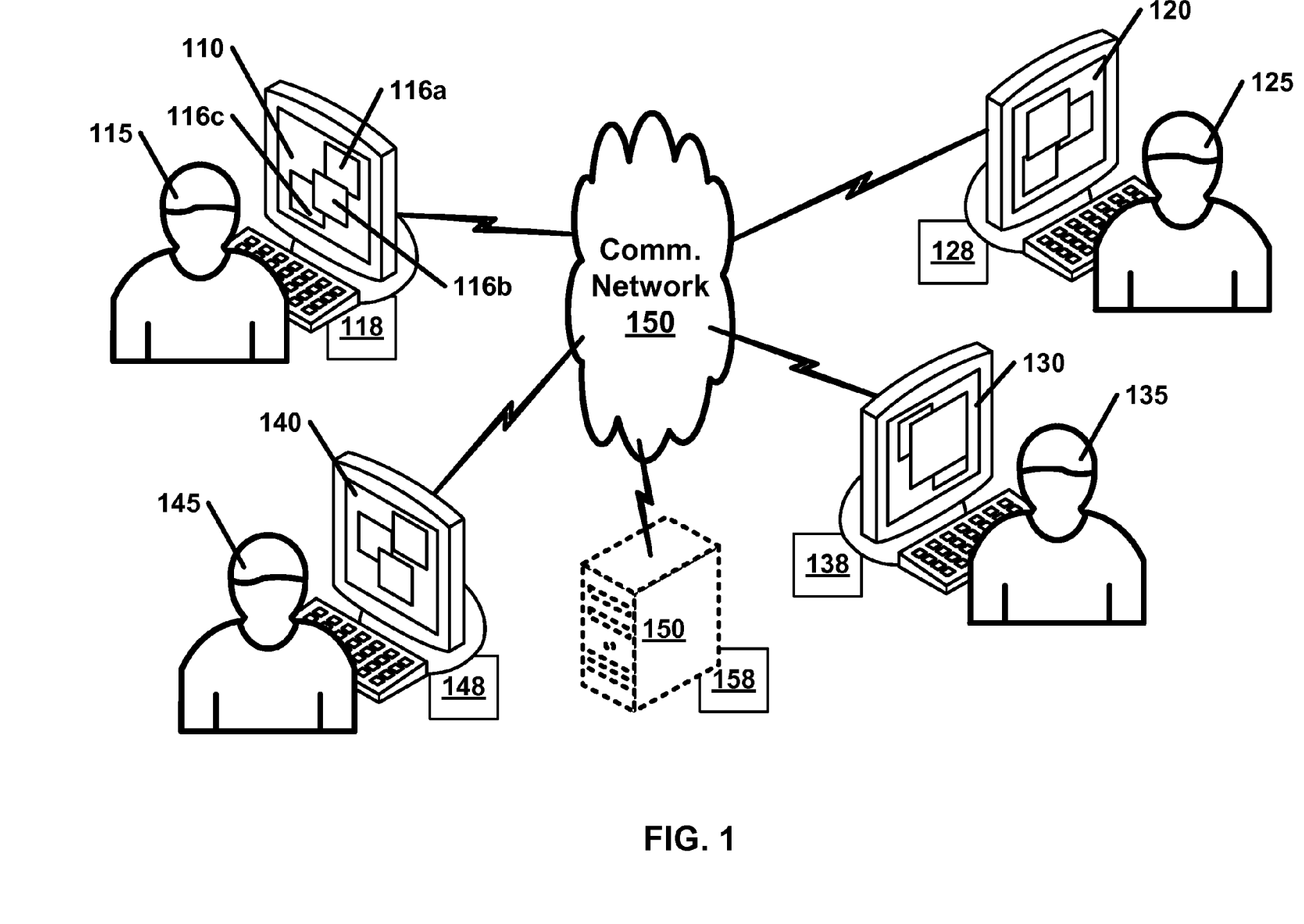
FIG. 1 is an illustration of an example of several individuals interacting in a collaborative interaction as per an aspect of an embodiment.

Referring now to FIG. 1, an example of several individuals participating in a collaborative interaction as per an aspect of an embodiment is shown. In the illustrated example, an individual 115 is involved in a group of collaborative efforts with different interest topics (e.g. projects) and with different peers/groups such as, for example, individuals 125, 135 and 145. Such collaborative interactions may be guided by scheduled calendar events and, in some cases, the collaborative interactions may involve repetitive events. The repetitive events may be associated with a common project where a set of milestones are involved. For example, an individual may participate in a project where the team members make use of artifacts such as one or more web conferences, communities and/or teleconferences. The same individual may be involved in another project where the team members use artifacts such as one or more document libraries, web conferences on a different server, teleconferences with different numbers, and/or project schedulers. The same individual may be involved in yet another project where the team members use databases and/or teleconferences with yet a different number.

Each of these teams may have different combinations of individual members. For example, one team may include the individuals 115, 125 and 135. Another team may include the individuals 115, 135 and 145. Yet another team may include individuals 115, 125, 135 and 145. Each individual may operate from a workspace. For example, the individual 115 may have a workspace 110, individual 125 may have workspace 120, individual 133 may have workspace 130, and individual 145 may have workspace 140. The individual members of a collaborative interaction may share a common workspace, or alternatively, the individual members of the collaborative interaction may develop a unique workspace that includes common artifacts. Artifacts may include one or more of tools, technologies and/or communication vehicles. Example artifact interfaces are shown on workspace 115 for individual 115 as artifacts 116a, 116b, and 116c.

Participants in social and collaborative interactions may establish a pattern of artifact usage during interactive collaborations, wherein time may be lost at the start of these interactions to formulate a superset "workspace" that may be relevant to that social and/or collaborative occasion. Likewise, the heterogenity and plurality of artifacts such as information repositories, web conference servers, communication mechanisms, document libraries, and/or the like may be such that the act of each user priming their workspace for meeting(s) is a time consuming task. As will be discussed in greater detail, embodiments may provide an autonomic mechanism to initialize a workspace for an individual prior to the beginning of a collaborative interaction based upon the past behavior of the group participants in similar collaborative interactions.

Figure 4:
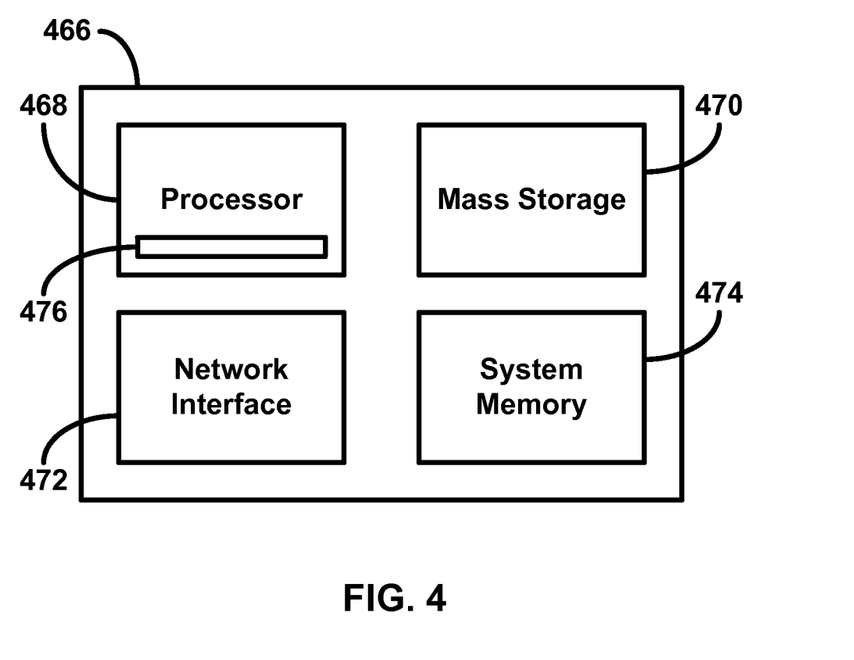
FIG. 4 is a block diagram of an example of a computing device according to an embodiment.

Autonomic mechanisms are shown for each workspace. For example, workspace 110 may employ autonomic mechanism 118, workspace 120 may employ autonomic mechanism 128, workspace 130 may employ autonomic mechanism 138, and workspace 140 may employ autonomic mechanism 148. Autonomic refers to the self-managing characteristics of distributed computing resources, adapting to unpredictable changes while hiding intrinsic complexity to operators and users. FIG. 4 shows the structure of an example computing device that may support an example autonomic mechanism. According to some of the various embodiments, part or all of an autonomic mechanism may employ normal workstation systems and/or may operate out of a separate computing device such as a server 150. For example, server 150 may employ autonomic mechanism 158.

According to some of the various embodiments, the automatic priming of a workspace may be based on seeded patterns from prior interactions. The seeded patterns may be identified by conducting an analysis of artifact use such as business applications and/or tools used in these prior interactions to establish a pattern of relevance. From the pattern of relevance, some of the various embodiments may automatically establish and/or prime a workspace that pre-launches selected artifacts such as applications and/or tools. The act of pre-launching a workspace may include embedding relevant artifacts (e.g. documents, schedules, web conferences, team rooms, communities, and/or the like), in time for an upcoming collaborative interaction, and prime the desired workspace to be ready for the collaborative interaction.

Embodiments may therefore help users prepare for multiple collaborative interactions (such as meetings surrounding different topics, with different peers inside and outside an organization) which have to deal with different combinations of artifacts such as tools, applications, data sets, and/or the like. Of particular note is that substantial time may otherwise be lost establishing relevant workspaces when these occasions arise. Moreover, embodiments may analyze past behavior of participant to establish a context for the collaboration. The context may discern relevant artifacts such as tools, applications, data sets, and/or the like and re-instating the relevant artifacts. In one example, the context includes artifacts such as social tools, internal and external repositories, applications, business tools, and/or the like.

To establish a context, various embodiments may employ analytics on past collaborative interactions among multiple individuals to discern which artifacts (e.g. applications, communication vehicles, tools of choice, and/or the like that surround social and collaborative interactions that take place) should be initialized when priming a workspace (either individual or shared). The results of these analytics may facilitate autonomic and advance priming of such work spaces in time for collaborative interactions. To assist the analytics, some of the various embodiments may maintain a repository that tracks setups, artifact usage, choices, and behaviors.

In the example of FIG. 1, individuals 115, 125 and 135 may meet regularly (e.g. weekly) and, over time, default to the same teleconference, the same eMeeting server, the same document library, the same community, and the same project file. Embodiments may identify this pattern among the three users over time. Embodiments may then autonomically instantiate a portal like workspace for each participant. A portal may be a point of access to information on a network such as an Intranet or the Internet. In some embodiments, portals may be web based. In yet other embodiments, portals may be program based. Some portals may include advance-authentication of users to a workspace at (or prior) to the time of a meeting start. Some portals may add relevant portlets to a workspace which (in turn) may front and render various applications that users conventionally and historically used in prior collaborative sessions.

A portlet may be a pluggable user interface software component that manages and displays in a portal. Portlets may produce fragments of markup code that may be aggregated into a portal. Typically, following the desktop metaphor, a portal page may be displayed as a collection of non-overlapping portlet windows, where each portlet window displays a portlet. Hence a portlet (or collection of portlets) may resemble a web-based application that is hosted in a portal. Examples of portlet applications include, but are not limited to: email, calendars, weather reports, discussion forums, and news. In some of the various embodiments, a portlet may be created that fronts a document library. Likewise, a portlet may render an associated web conference session with a uniform resource locator (URL). User names and passwords may be pre-validated. Portlets may be configured so that a user may maximize or minimize the portlet at will.

Some of the various embodiments may autonomically prime a workspace where the content of that workspace may be rendered in real time. The content of a workspace may represent portlets (or widgets or any arbitrary user interface (UI) technology) to discern a collaborative workspace primed for the purposes and objectives of a collaborative interaction, biased by decisions made in past interactions to discern the workspace contents. A workspace may include an individualistic workspace primed for each user, or alternatively, a workspace may include a single collaborative workspace that a group of users collectively converge to.

Knowledge of users' interactions may be stored. The knowledge may include artifacts used by multiple individuals in interactive collaborations. Artifacts may include applications, communication mechanisms that these users use as part of the collaborative interaction, and/or the like. From this knowledge, a pattern of behavior over time may be established. From the pattern of behavior over time, an intended workspace may be abstracted. Embodiments may autonomically instantiate an intended workspace, populating the page with several portlets/widgets, UI artifacts, and/or the like to preferred tools, databases, repositories, and/or the like that the users conventionally use.

Figure 2:
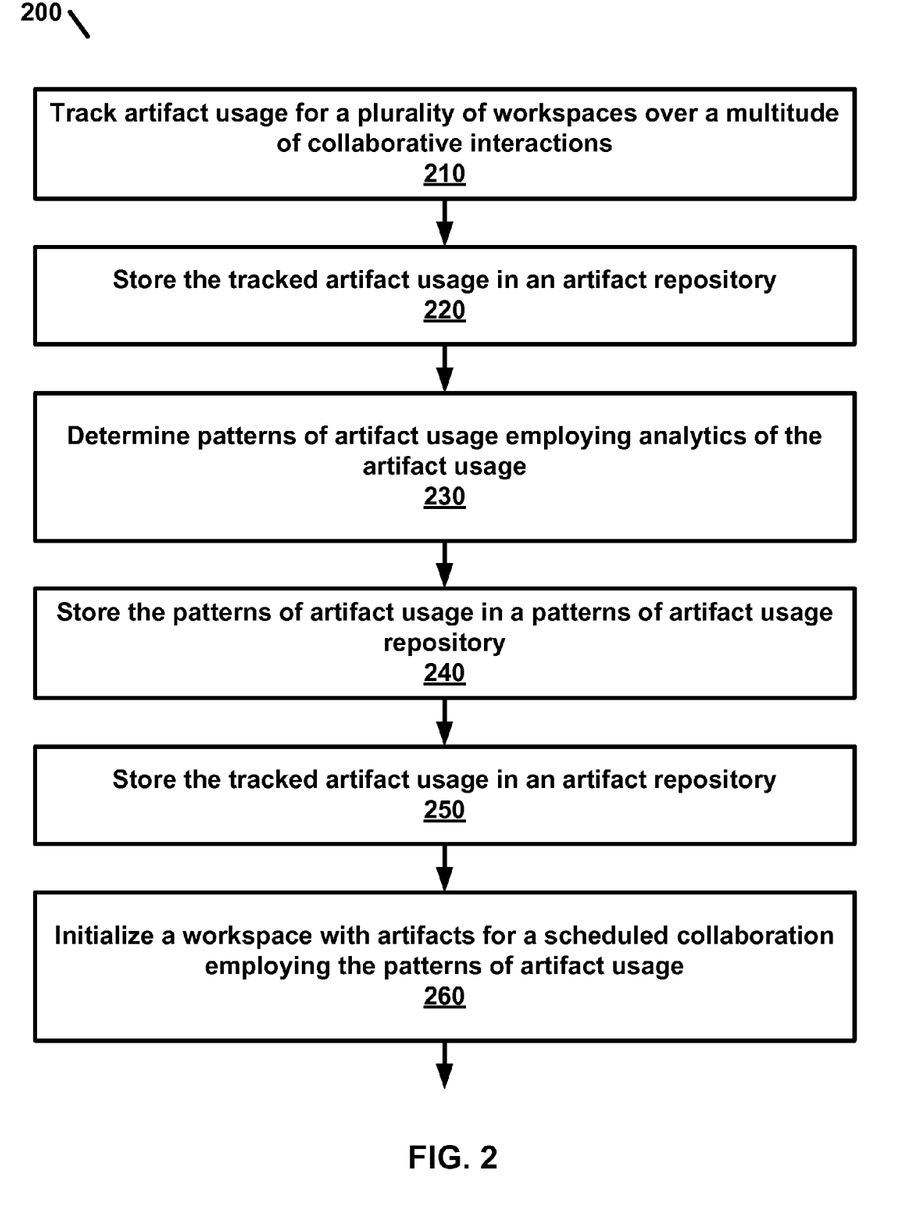
FIG. 2 is a flowchart of an example of a method of priming a workspace according to an embodiment.

Some of the various embodiments may include a computer program product that has computer usable code stored on a computer readable storage medium. The computer usable code may be configured to be executed by a processor to cause a computer to perform a method. FIG. 2 is a flowchart of an example method 200 of priming a workspace according to some of the various embodiments.

At block 210, artifact usage may be tracked for a plurality of workspaces over a multitude of collaborative interactions, where each workspace may be used by an individual. Some of the multitude of collaborative interactions may be between a subset of the plurality of workspaces. In other words, some interactions may be between smaller groups of individuals operating within a larger group of individuals operating within a workspace framework. Other interactions may be between other groups of individuals operating within the collaborative workspace framework. Workspaces may operate on computers, laptops, tablets, smart devices, and/or the like.

Artifacts may include tools, applications, documents, schedules, web conferences, team rooms, databases, libraries, and/or the like. Some of the artifacts may be configured for a particular individual. Some artifacts may be shared among individuals conducting a collaborative interaction.

Some of the various embodiments may track artifact usage at block 220. The tracked artifact usage data may be analyzed as they occur and/or the tracked artifact usage data may be stored in a repository such as an artifact repository. Tracking may be performed by a background task. Tracking may also be performed by a server. Some workspaces may share tracking information with other workspaces and/or servers.

Patterns of artifact usage may be determined through an analysis of the artifact usage at block 230. The analysis may use analytics. Analytics may include the discovery and communication of meaningful patterns in data. Additionally, analytics may rely on the simultaneous application of statistics, computer programming and operations research to quantify the patterns of artifact usage. According to some of the various embodiments, at block 240, the patterns of artifact usage may be stored in a repository such as a pattern of artifact usage repository.

A workspace may be initialized with artifacts for a scheduled collaboration based on the patterns of artifact usage at block 260. The initialization of the workspace may include loading selected artifacts such as selected applications, and/or selected portals. In some of the various embodiments, an individual user may be provided with a set of workspace configurations from which to choose. In other embodiments, the workspace configuration may provide artifacts that may be necessary for the group collaboration in addition to artifacts that are specific for the individual user.

Figure 3:
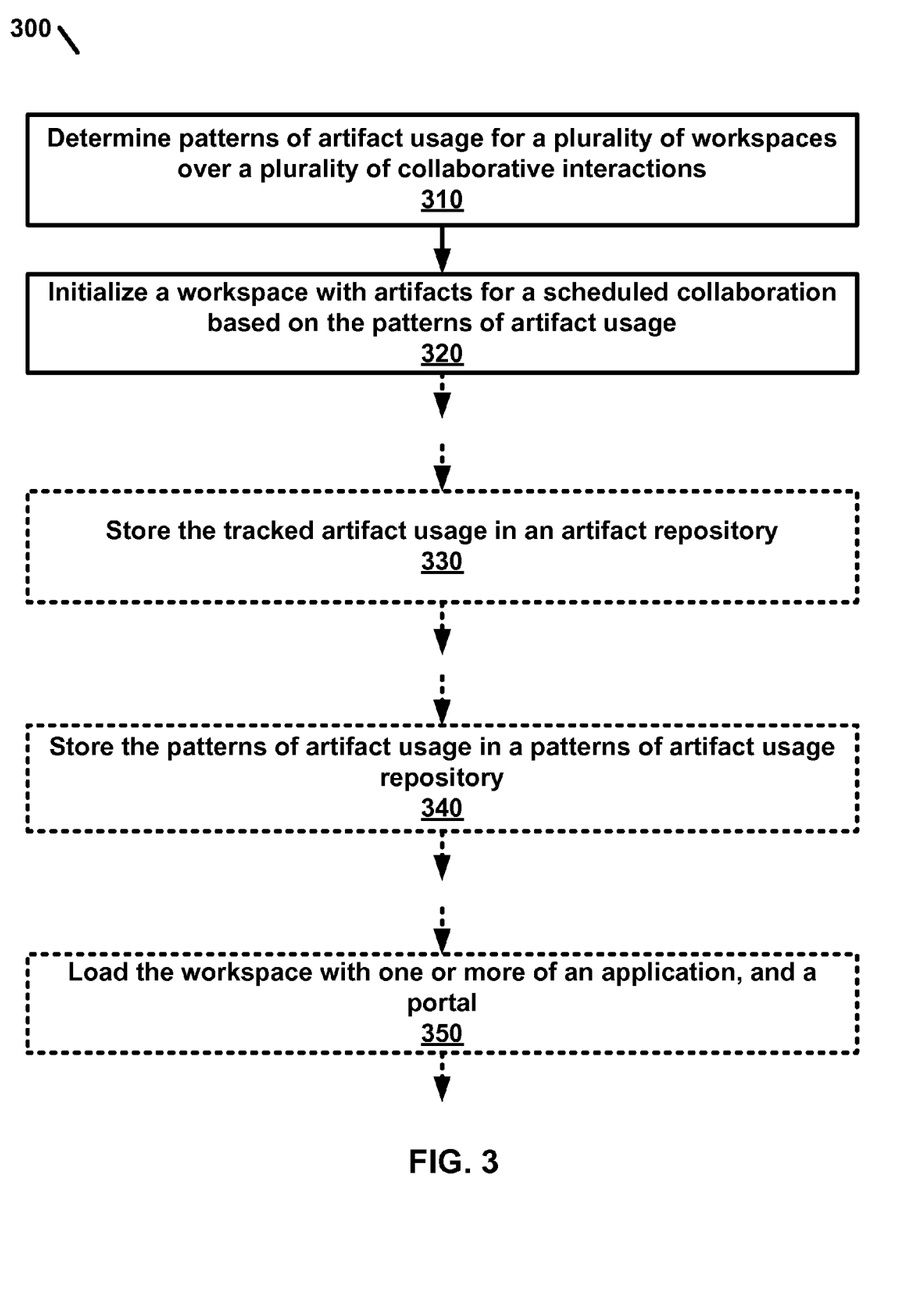
FIG. 3 is a flowchart of another example method of priming a workspace according to an embodiment.

There may be additional methods of performing embodiments. For example, FIG. 3 shows a flowchart of another example method 300 of priming a workspace according to some of the various embodiments. In this illustrative example, patterns of artifact usage for a plurality of workspaces over a plurality of collaborative interactions may be determined at block 310. This determination may be made using analytics. As discussed earlier, some of the multitude of collaborative interactions may be between a subset of the plurality of workspaces. A workspace for an individual may be initialized with artifacts for a scheduled collaboration based on the patterns of artifact usage at block 320.

One or more repositories may be maintained. Examples of repositories include an artifact repository, a pattern of artifact usage repository, and/or the like. Tracked artifact usage may be stored in an artifact repository at block 330. The patterns of artifact usage may be stored in a pattern of artifact usage repository at block 340. The repositories may reside on a supporting system, on a shared storage resource, and/or the like.

As part of the initialization, artifacts may be loaded onto an individual's workspace with artifacts such as selected applications and/or portals at block 350. The selected portals may include an interface to any number of shared artifacts such as one or more document libraries, associated web conferences, online or virtual communities, uniform resource locators, user interfaces, and/or the like.

FIG. 4 shows an example computing device that may support an example autonomic mechanism. The example computing device 466, as illustrated, has a processor 468, mass storage 470 (e.g., read only memory/ROM, optical disk, flash memory), a network interface 472, and system memory 474 (e.g., random access memory/RAM). In the illustrated example, the processor 468 is configured to execute logic 476, wherein the logic 476 may implement one or more aspects of the method 200 (FIG. 2) and/or the method 300 (FIG. 3), already discussed. Thus, the logic 476 may enable the computing device 466 to function as a campaign management system and/or brokering system, depending upon the circumstances. The logic 476 may also be implemented as a software application that is distributed among many computers (e.g., local or remote). Thus, while a single computer could provide the functionality described herein, systems implementing these features can use many interconnected computers (e.g., for scalability as well as modular implementation).

In this specification, "a" and "an" and similar phrases are to be interpreted as "at least one" and "one or more." References to "an" embodiment in this disclosure are not necessarily to the same embodiment.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) configuring individual workspaces for teleconference type collaborations. However, one skilled in the art will recognize that embodiments of the invention could be used for other types of collaborations such as interactions between autonomous systems, and/or interactions between laboratories and associated equipment. For example, portals could be initialized to allow interactions between multiple units within a supervisory data acquisition and control system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. In addition, the terms "first", "second", etc. may be used herein only to facilitate discussion, and carry no particular temporal or chronological significance unless otherwise indicated.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

In addition, it should be understood that any figures that highlight any functionality and/or advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

What is claimed is:

1. A computer program product comprising:
a non-transitory computer readable storage medium; and
computer usable code stored on the non-transitory computer readable storage medium, where, if executed by a processor, the computer usable code causes a computer to:
track shared artifact usage for a plurality of workspaces over a plurality of collaborative interactions;
store the tracked shared artifact usage in an artifact repository;
conduct an analysis of the tracked shared artifact usage to determine patterns of artifact usage of at least one participant; and
store the patterns of artifact usage in a patterns of artifact usage repository;
initialize a unique workspace on a plurality of computer devices with artifacts for a scheduled collaboration employing the patterns of artifact usage;
wherein the unique workspace on each of the plurality of computer devices includes artifacts that are unique to one of the computer devices;
wherein the unique workspace is an individual workspace that is primed for each of the plurality of computer devices based on past behavior of each participant; and
wherein at least one of the collaborative interactions are between a subset of the plurality of workspaces operating within a larger group of workspaces, and the subset of the plurality of workspaces communicates with the larger group of workspaces.

2. The computer program product of claim 1, wherein the artifacts are selected from a group consisting of a tool, an application, a document, a schedule, a web conference, and a team room.

3. The computer program product of claim 1, wherein the computer usable code, if executed, causes a computer to load the workspace with at least one of selected applications, and selected portals.

4. A computer program product comprising:
a non-transitory computer readable storage medium; and
computer usable code stored on the non-transitory computer readable storage medium, where, if executed by a processor, the computer usable code causes a computer to:
determine patterns of artifact usage for a plurality of workspaces on a plurality of computer devices over one or more collaborative interactions; and
initialize a unique workspace on each of the plurality of computer devices with artifacts for a scheduled collaboration based on the patterns of artifact usage,
wherein the unique workspace on each of the plurality of computer devices includes artifacts that are unique to one of the computer devices;
wherein the unique workspace is an individual workspace that is primed for each of the plurality of computer devices based on past behavior of each participant of the plurality of workspaces; and
wherein at least one of the collaborative interactions are between a subset of the plurality of workspaces operating within a larger group of workspaces, and the subset of the plurality of workspaces communicates with the larger group of workspaces.

5. The computer program product of claim 4, wherein the artifacts are selected from a group consisting of a tool, an application, a document, a schedule, a web conference, and a team room.

6. The computer program product of claim 4, wherein the computer usable code, if executed, causes a computer to load the workspace with one or more of an application, and a portal.

7. The computer program product of claim 4, wherein the computer usable code, if executed, causes a computer to employ analytics in determining the patterns of artifact usage.

8. The computer program product of claim 4, wherein the computer usable code, if executed, causes a computer to store tracked artifact usage in an artifact repository.

9. The computer program product of claim 4, wherein the computer usable code, if executed, causes a computer to store the patterns of artifact usage in a pattern of artifact usage repository.

10. The computer program product of claim 4, wherein the computer usable code, if executed, causes a computer to load the workspace with at least one of a selected application, and a selected portal.

11. The computer program product of claim 10, wherein the at least one selected portal is selected from a group consisting of a document library, an associated web conference, a community, a uniform resource locator, and a user interface.

* * * * *